United States Patent
Stern

(10) Patent No.: US 7,677,203 B2
(45) Date of Patent: Mar. 16, 2010

(54) EDIBLE PET CHEW

(76) Inventor: Mark Stern, 33 Fifth Ave., PHB, New York City, NY (US) 10003

( * ) Notice: Subject to any disclaimer, the term of this patent is extended or adjusted under 35 U.S.C. 154(b) by 611 days.

(21) Appl. No.: 11/602,939

(22) Filed: Nov. 21, 2006

(65) Prior Publication Data
US 2008/0118606 A1    May 22, 2008

(51) Int. Cl.
*A01K 29/00* (2006.01)
(52) U.S. Cl. ........................................ 119/709
(58) Field of Classification Search ............ 119/702, 119/707–711, 174; 426/2, 92, 132, 635, 426/805, 641, 807, 315, 94, 143, 279
See application file for complete search history.

(56) References Cited
U.S. PATENT DOCUMENTS

| | | | |
|---|---|---|---|
| 4,260,635 A | 4/1981 | Fisher | |
| 4,364,925 A | 12/1982 | Fisher | |
| 4,702,929 A | 10/1987 | Lehn et al. | |
| 4,771,733 A | 9/1988 | Axelrod | |
| 4,822,626 A | 4/1989 | Spanier et al. | |
| 4,868,002 A | 9/1989 | Scaglione et al. | |
| 4,921,714 A | 5/1990 | Matthews et al. | |
| 5,047,231 A | 9/1991 | Spanier et al. | |
| 5,407,661 A | 4/1995 | Simone et al. | |
| 5,485,809 A | 1/1996 | Carroll | |
| 5,673,653 A * | 10/1997 | Sherrill .................... | 119/709 |
| 5,695,797 A | 12/1997 | Geromini et al. | |
| 6,110,521 A | 8/2000 | Axelrod | |
| 6,126,978 A | 10/2000 | Axelrod | |
| 6,238,715 B1 | 5/2001 | Baikie | |
| 6,274,182 B1 | 8/2001 | Axelrod et al. | |
| 6,277,420 B1 | 8/2001 | Andersen et al. | |
| 6,365,133 B1 | 4/2002 | Rich | |
| 6,584,938 B2 | 7/2003 | Sherrill et al. | |
| 6,672,252 B2 * | 1/2004 | Levin et al. .................. | 119/709 |
| 6,725,809 B1 | 4/2004 | Olgin | |
| 6,799,536 B1 * | 10/2004 | Jia et al. ..................... | 119/710 |
| 6,815,000 B2 | 11/2004 | Kesler | |
| 6,840,196 B2 * | 1/2005 | Kirch .......................... | 119/710 |
| 6,886,496 B1 | 5/2005 | Brown | |
| 6,886,497 B1 * | 5/2005 | Hague ......................... | 119/710 |
| 6,895,900 B2 * | 5/2005 | Hingst ........................ | 119/710 |
| 6,935,275 B2 * | 8/2005 | Jia et al. ..................... | 119/710 |
| 7,025,020 B2 * | 4/2006 | Brown ........................ | 119/710 |
| 7,082,894 B2 * | 8/2006 | Sherrill et al. .............. | 119/709 |
| 7,194,981 B2 * | 3/2007 | Kirch et al. ................. | 119/710 |
| 2002/0119224 A1 | 8/2002 | Axelrod et al. | |
| 2006/0188611 A1 | 8/2006 | Unlu et al. | |

OTHER PUBLICATIONS

Greenies Product Information—1999 (6 pages).

* cited by examiner

*Primary Examiner*—Thomas Price
(74) *Attorney, Agent, or Firm*—Reising Ethington P.C.

(57) ABSTRACT

An edible pet chew 114 has a first casing 10 of plant base material and a second protein 12 of flavored material for example jerky that is wrapped with the first sheet to form alternating layers in the edible pet chew.

14 Claims, 3 Drawing Sheets

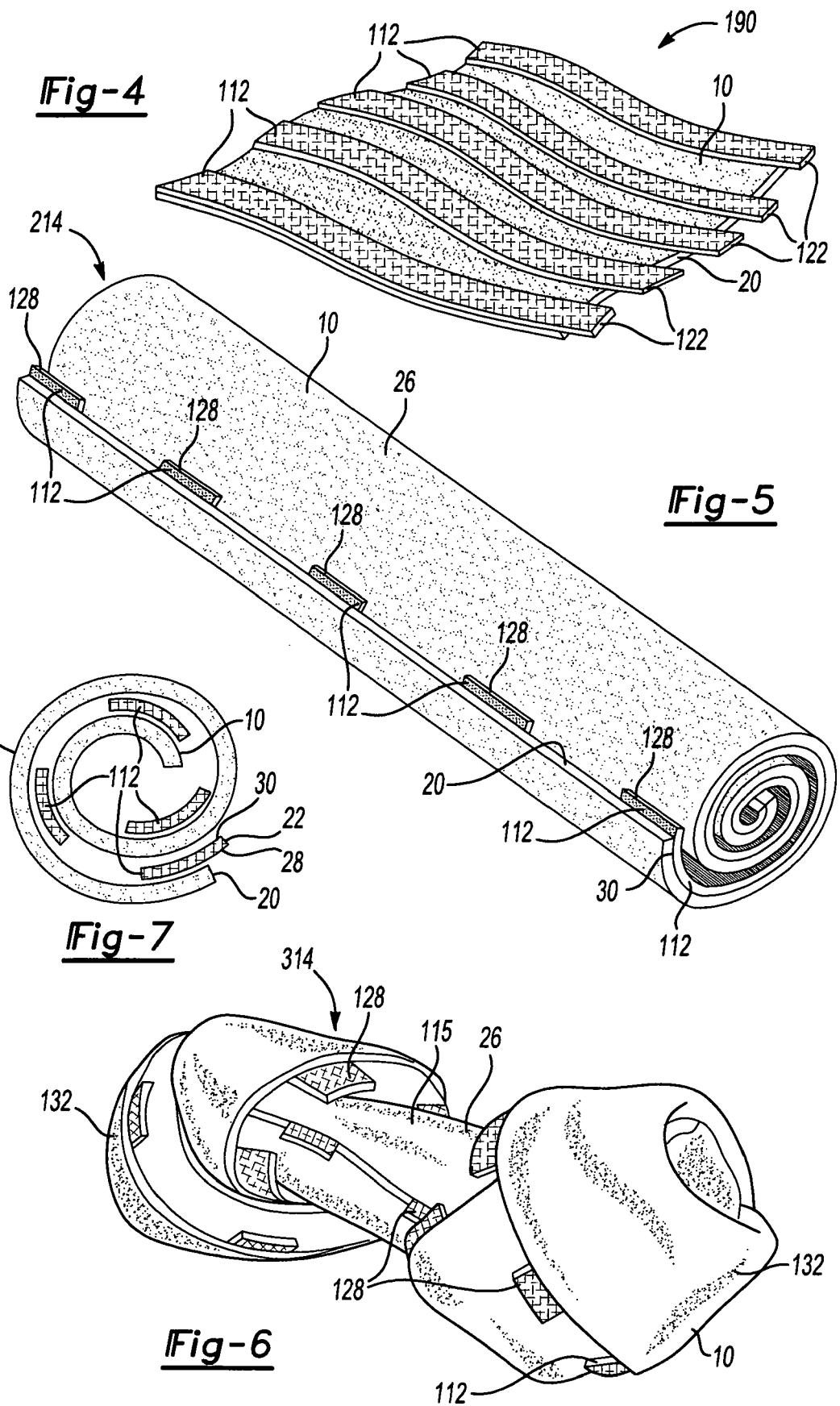

EDIBLE PET CHEW

TECHNICAL FIELD

The field of this invention relates to an edible pet chew.

BACKGROUND OF THE DISCLOSURE

A single visit to a pet supermarket makes it readily apparent that there is a wide selection of rawhide and other synthetic chew toys manufactured and shaped for dogs and other carnivorous pets to chew on. Pet owners believe chew toys are desirable for cleaning the teeth of dogs and other pets, providing for dental hygiene and resulting in better breath. The chew toys also distract the pet from chewing on other objects such as shoes or furniture.

Many of these chew toys have been made from synthetic materials such as plastic, for example, nylon or even rubber to provide a long lasting chew toy. These synthetic chew toys are be indigestible and may pose a health risk if the dog bites off a portion and swallows it. Secondly, these toys may lose a dog's interest because the toy typically has no flavor or other chew incentive.

Other chew toys are made from rawhide. Rawhide also has no inherent flavor and thus may lose a dogs interest after only a short chew time. To overcome the lack of flavor and taste of rawhide, many manufacturers have attempted to add flavor to the pet chew by adding jerky, natural flavors or even pig hide in addition to the rawhide. Flavors may also be injected into the rawhide, marinated into the rawhide, wrapped in the rawhide or impregnated into the rawhide.

Many people are concerned that the manufacture of rawhide is a relatively unregulated industry and the origins of the rawhide may be unknown and the degree of contamination of the rawhide with antibiotics, insecticides or other detrimental elements for example, lead, may also be unknown. Furthermore, rawhide provides no nutritional benefits and is only slowly digestible if at all. These concerns whether they all be true or unfounded provides a perception for dog and other pet owners to seek alternative ways to provide a chew treat for a pet without the use of rawhide.

One such pet chew recently placed on the market is a product made from a solid molded wheat based material with glycerin, gelatin, monoglycerides of edible fatty acid, and natural flavor. It also contains chlorophyll which is marketed to improve the dog's breath. This molded plant material composite is molded into an elongated shape with one end shaped like a toothbrush head and an opposite end shaped like an epiphysis i.e. end of a long bone.

It is also known to make a jerky-like material both in texture and taste from of soy protein isolate and wheat starch formed into elongated strips. It is also known to provide an extruded composite for dry diets formed from emulsified meat and grain meal byproducts.

What is needed is an improved edible pet chew that has an outer layer of hardened and chewable plant based material in conjunction with an inner layer of material that contains at least in part flavored content or actual dried or cured animal flesh content.

SUMMARY OF THE DISCLOSURE

In accordance with one embodiment of the invention, an edible pet chew has a layer of hardened chewy plant base material and a layer sheet of a chewy edible material. The first and second sheets are superimposed adjacent each other into a composite assembly with the first sheet and second sheet forming alternating layers in the composite assembly.

Preferably, the first sheet of plant base material includes a plant based composition being wrapped about the second sheet. The first and second sheets wrapped into a roll form to form an interleaved spiral shape in cross-section with the first sheet substantially forming a hardened layer of the edible pet chew. The first sheet may be made from an initially malleable and hardenable mixture of wheat protein and gelatin. A plant protein composition is desirably extrudable to form the first sheet. Only a small percentage of gelatin is needed, for example under 5% of the composition by weight, to provide enough malleability for extrusion, molding and other bending and forming.

In one embodiment, the edible pet chew has a tied knot at each end thereof to resemble epiphyses of a bone. The second sheet may be made from a plant based material having flavor infused therein. Alternately, the second sheet may be formed from a meat composite bound with a binder. In one embodiment, the second sheet may be formed from a jerky of dried or cured animal flesh.

In accordance with another aspect of the invention, the edible pet chew includes a casing of hardened chewable plant based material and a chewy edible member therein. Preferably, the outer casing is in the form of a first sheet that provides an outer layer of the edible pet chew. The chewy edible member therein is substantially inside the edible pet chew and may be a cured or dried animal flesh.

In accordance with another aspect of the invention, a method of forming an edible pet chew includes providing a plant based mixture that is extrudable or sheetable and initially malleable forming the initially malleable plant based mixture into a first sheet, providing a second sheet made from material having flavor, placing the first and second sheets in superimposed relation forming multiple layers and hardening the first sheet after it is formed with the second sheet. Preferably the first and second sheets are rolled together and preferably rolled with the first sheet forming an outer layer.

Preferably, the ends of the edible pet chew are tied into knots before hardening of the first sheet. Preferably, the first sheet is made from a plant protein composition, and the second sheet is made from a meat based material. The first sheet is made from a plant base and glycerin composition, and the second sheet is made from a meat jerky. The method also includes wrapping the first sheet about the second sheet to form an outer layer of the edible pet chew.

In another embodiment of the invention to outer portion of plant based material is injection molded to form one or more cavities in which the jerky can be inserted. Injection molding is the preferred method to produce a three dimensional shape. An alternative to injection molding the outer portion could be extrusion, co-extrusion, cold molding or compression molding. After the outer case is formed, the jerky can be inserted either wholly or partially into the formed cavities.

BRIEF DESCRIPTION OF THE DRAWINGS

Reference now is made to the accompanying drawings in which:

FIG. 4 is a top plan view showing a plurality of meat flavored strips placed on top of the first sheet in preparation of forming another alternate embodiment of a pet chew;

FIG. 5 an alternate embodiment of an edible pet treat formed from the sheets shown in FIG. 4;

FIG. 6 an alternate embodiment of an edible pet treat formed also from the sheets shown in FIG. 4;

FIG. 7 is a side view of another embodiment of an edible pet chew;

DETAILED DESCRIPTION OF THE PREFERRED EMBODIMENT

Figure 1:
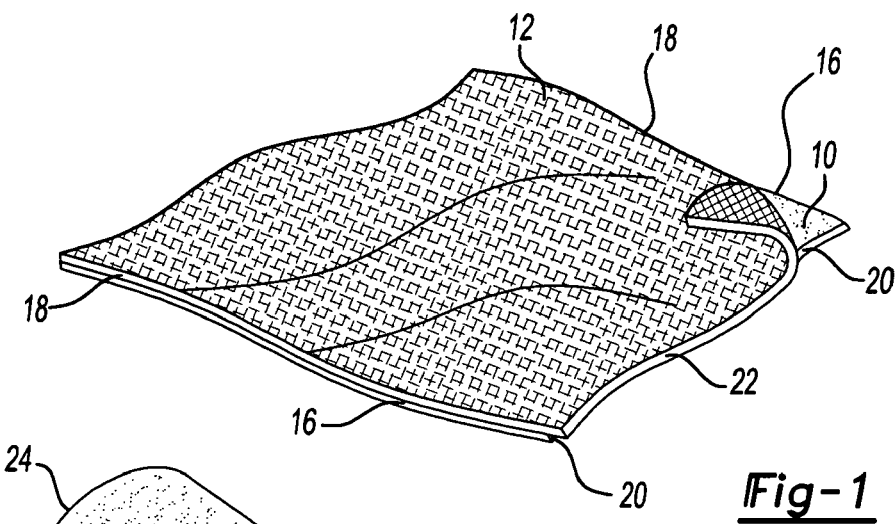
FIG. 1 is a perspective view showing a first sheet of a wheat based material with a second jerky sheet laid over the first sheet in preparation of forming an edible pet chew in accordance with one embodiment of the invention.

Referring now to FIG. 1, a first sheet 10 of an extruded or rolled plant based composition, for example a wheat protein mixed with a gelatin or other binder for example glycerin is laid flat. The term "plant based" means material having substantially over 50% of plant material. The gelatin may be a small percentage by weight, for example 5%, to provide sufficient malleability, moldability, extrudability, and formability as set forth in further detail below. Other plant materials may be substituted for the above mentioned materials as long as the material is a cohesive material that can be rolled and formed in a malleable state and eventually hardened by heat or drying into a hard but chewable matter for use by a carnivorous pet. The sheet 10 may be formed by extrusion, pressing or rolling or injection molding for example.

A second sheet 12 may be made from flavored material, for example, natural meat jerky. The sheet 12 is superimposed over the first sheet 10. The second sheet 12 may alternately be made from a jerky composition that is a mixture of meat and other binders to form a chewable composite that is malleable enough to be rollable. In another variation, the second sheet 12 may also be made from an initially malleable plant based sheet that is impregnated with meat, chicken, fish or jerky pieces or merely infused with flavors attractive to a pet.

The side edges 18 of the second sheet may be coextensive, i.e. aligned with the side edges 16 of the first sheet 10. The front edge 22 of the second sheet may overlap the front edge 20 of sheet 10.

Figure 2:
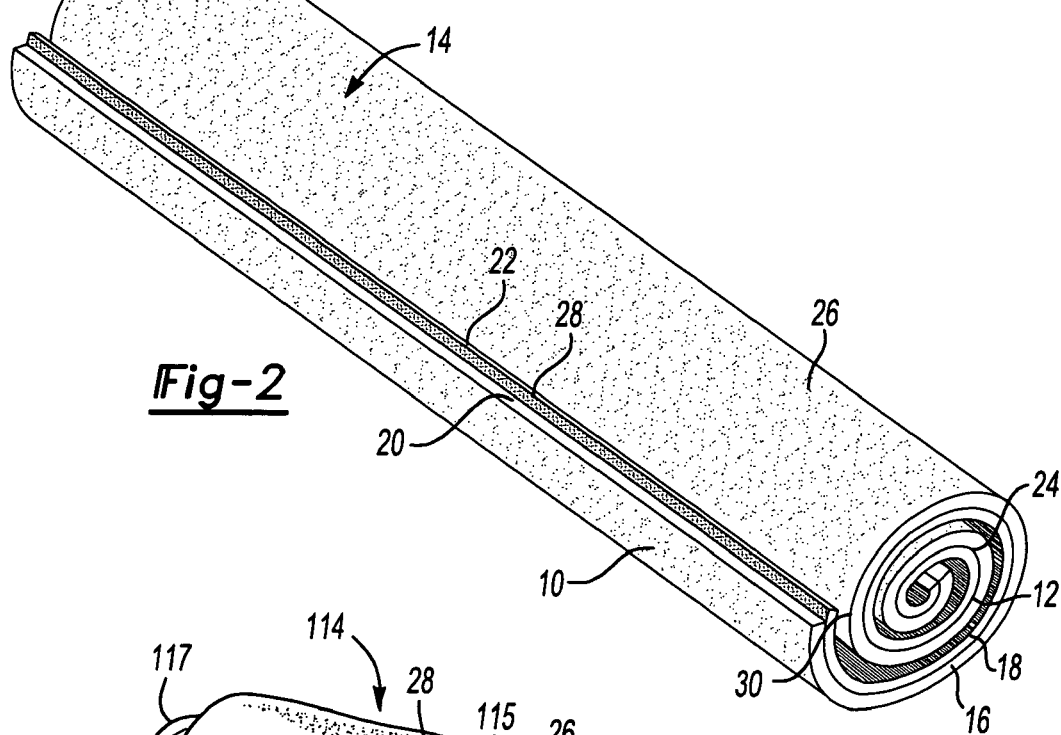
FIG. 2 is a perspective view of one embodiment of the edible pet chew.

Once the first and second sheets 10 and 12 as shown in FIG. 1, are flattened out, they are then rolled up as shown in FIG. 2 to form a cylinder shaped edible pet chew 14 having rolled ends 24 with interleaved layers of sheet 10 and sheet 12 with aligned edges 16 and 18. The sheets 10 and 12 form an interleaved spiral shape in cross-section. The sheets 10 and 12 are rolled such that the sheet 10 forms the outer layer 26. The front edge 22 of sheet 12 by extending further than the front edge of edge 20 of sheet 10 forms a lip 28. The lips 28 project out of the seam 30 in the outer layer 26 adjacent the edge 20 of sheet 10. The cylinder shaped pet chew 14 is then allowed to dry to harden the composition forming the first sheet 10.

Figure 3:
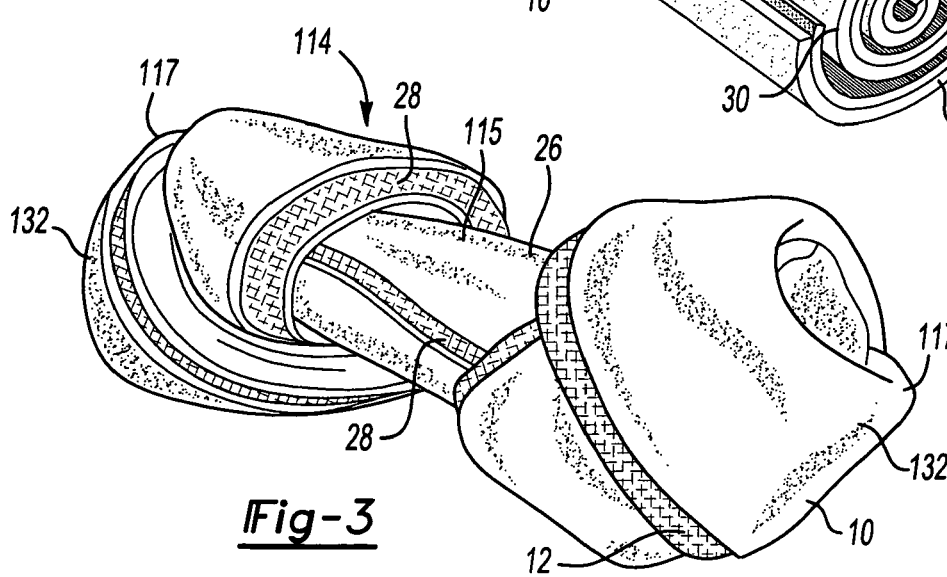
FIG. 3 is another embodiment having two knotted ends to simulate the epiphyses of a bone with a diaphysis in the middle.

As shown in FIG. 3, an alternate shaped pet chew 114 can be formed to more closely simulate an elongated bone with an elongated middle section 115 also referred to as a diaphysis and opposite simulated epiphyses 117 formed by knots 132 tied at each end 24 of the cylinder shaped assembly 14 as shown in FIG. 2 before it's hardened. The alternately shaped edible pet chew 114 still has the same aligned edges 16, and 18 and the same lip 28 of the second sheet protruding out of seam 30 at the epiphyses 117 as well as therebetween is elongated middle section 115.

Another alternate embodiment composite sheet assembly 190 is shown in FIG. 4 where instead of single sheet of jerky material is disposed on sheet 10, a plurality of elongated strips of jerky i.e. narrow sheets 112 are spaced apart onto sheet 10. The narrow sheets 112 each have a front edge 122 extending beyond edge 20 of sheet 10. The sheet assembly 190 is laid flat and then rolled in the same fashion as before to form the cylinder assembly 214 shown in FIG. 5 that has at seam 30 a plurality of exposed lips 128 of the sheets 112. Again, this cylinder shape treat 214 may be dried and hardened as is or can be knotted in the same fashion as before to form the bone shaped pet treat 314 as shown in FIG. 6 with the exposed lips 128 formed in the knot ends 132 as well as the elongated middle section 115.

In a further embodiment, the elongated strips 112 may be laid transverse to what is shown in FIG. 4 so that when the sheets 110 and 112 are rolled, they produce an edible pet chew with an end 432 as shown in FIG. 7 with a solid lip 28 and a plurality of spaced sheets 112 within the outer layer 26 of sheet 10. Again, the cylinder may be allowed to dry and harden in this position or tied into a knot to form an edible pet chew that looks on the exterior substantially like the one shown in FIG. 3.

It is foreseen that more than one first sheet 10 of the plant based material and more than one sheet 12 of the flavor material may be used. It is also foreseen that the plurality of sheets 10, 12 may be interlayered without rolling to form a flat rectangular or other shaped edible pet chew. The composite pet chew may also be folded into another shaped pet chew.

Figure 8:
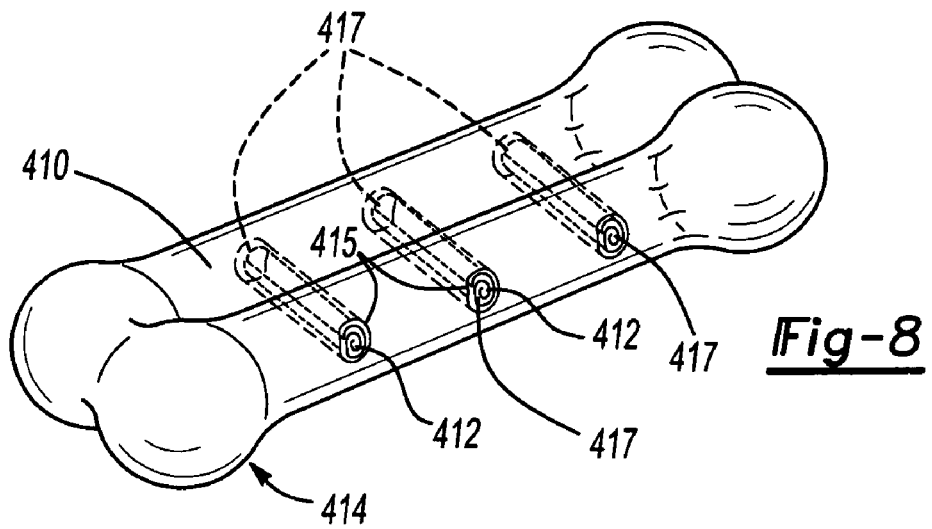
FIG. 8 is a perspective view of a pet chew with an outer molded casing with transverse holes for filling with an edible chewable material therein.

Referring now to FIG. 8, a pet chew 414 has a three dimensional molded outer casing 410 of plant based material has an elongated bone-like shape and having cavities 415 traversing the longitudinal axis of the outer casing 412. Jerky material or other dried or cured animal flesh 412 is inserted into the cavities 415. The outer casing 410 may be injected molded with the cavities 415 formed therein. Preferably, the exposed ends 417 of the jerky 412 is flush or slightly recessed in cavities 415 and the jerky is tightly packed in hole 415 to deter the jerky from being easily pulled out of the hole 415 such that the dog will chew through the outer shell 410 to access the jerky 412.

Figure 9:
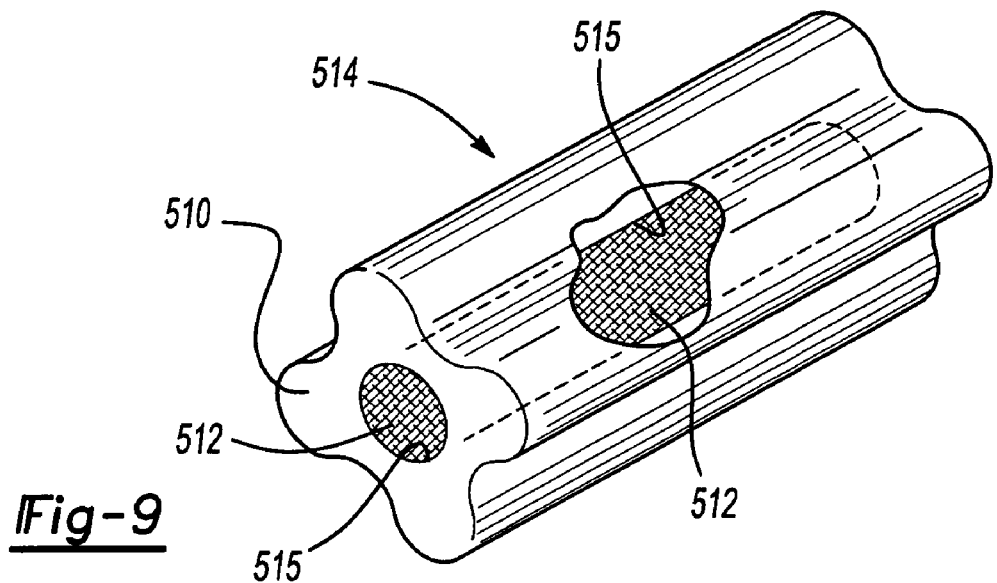
FIG. 9 is a perspective view of a pet chew with a molded outer casing with a longitudinal hole for filling with an edible chewable material therein.

Another molded form is shown in FIG. 9 where the pet chew 514 has the molded outer shell 510 of plant based material with a longitudinal extending cavity 515 filler with jerky material 512. The molded cavity 510 may have a clover leaf cross-sectional configuration as shown.

Figure 10:
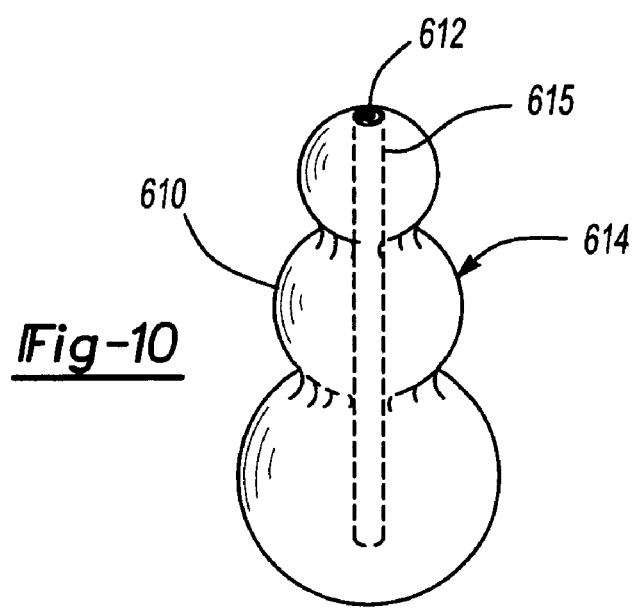
FIG. 10 is a perspective view of a pet chew with a molded outer casing with an alternate configuration.

In a modified embodiment shown in FIG. 10, the outer casing 610 of plant based material may have a three ball configuration surrounding longitudinal cavity 615 filled with jerky 612.

In this fashion, by providing an edible pet chew with a hardened and chewable outer wrap or casing made from a plant based material instead of rawhide, one avoids all the concerns whether real or perceived regarding the use of rawhide. Secondly, the plant based material has inherent nutrition and may be easily provided with added nutritional ingredients such as vitamins and minerals if desired.

Furthermore, the second sheet or inserts, whether it will be a natural jerky, jerky composite or plant based layer with flavor, provides a taste incentive for the pet to continue to chew and not lose interest in the pet chew after only a short period of time.

Other variations and modifications are possible without departing from the scope and spirit of the present invention as defined by the appended claims.

The embodiments in which an exclusive property or privilege is claimed are defined as follows:

1. An edible pet chew comprising:
   an outer casing of hardened chewable substantially plant based material;
   a chewy edible material positioned within said outer casing;
   said outer casing formed from a first sheet of said hardened chewable plant based material dimensioned large enough and thin enough to be initially malleable for use as a wrap by flexing, folding or rolling into a shape;
   said chewy edible material comprised of cured or dried animal flesh material;
   said first sheet forming an outer layer of said edible pet chew; and
   said cured or dried animal flesh material substantially inside said edible pet chew.

2. An edible pet chew as defined in claim 1 wherein said first sheet of plant based material includes a plant protein composition; and
   said first sheet being wrapped about said cured or dried animal flesh material, said cured or dried animal flesh material being in the form of a sheet of jerky.

3. An edible pet chew as defined in claim 2 wherein:
   said plant protein composition being extrudable to form said first sheet.

4. An edible pet chew as defined in claim 3 wherein:
   said first sheet is made from an initially malleable and hardenable mixture of plant protein and gelatin.

5. An edible pet chew as defined in claim 4 wherein:
   said cured or dried animal flesh material being in the form of a second sheet;
   said first sheet and second sheet are rolled to form an interleaved cylindrical roll that is knotted at each end.

6. An edible pet chew comprising:
   an outer casing of hardened chewable substantially plant based material;
   a chewy edible material positioned within said outer casing;
   at least one hole in said outer casing and being accessible to an exterior of said outer casing; and
   said at least one hole at least partially filled with said chewy edible material.

7. An edible pet chew comprising:
   a first sheet of hardened substantially chewy plant based material;
   a second sheet of a chewy edible material;
   said first and second sheets superimposed against each other into a composite assembly with the first sheet and second sheet forming alternating layers in the composite assembly; and said sheets being initially thin enough and malleable enough for flexing, folding and rolling into a shape.

8. An edible pet chew as defined in claim 7 wherein:
   said first sheet of plant based material includes a plant protein composition; and
   said first sheet being wrapped about said second sheet.

9. An edible pet chew as defined in claim 8 wherein:
   said plant protein composition being extrudable to form said first sheet.

10. An edible pet chew as defined in claim 7 further comprising:
    said first and second sheets wrapped into a roll form to form an interleaved spiral shape in cross-section, with the first sheet substantially forming a hardened layer of said edible pet chew.

11. An edible pet chew as defined in claim 10 further comprising:
    said edible pet chew having a tied knot at each end thereof.

12. An edible pet chew as defined in claim 7 further comprising:
    said second sheet being a plant based material having flavor infused therein.

13. An edible pet chew as defined in claim 7 further comprising:
    said second sheet formed from a meat composite bound with a binder.

14. An edible pet chew as defined in claim 7 further comprising:
    said second sheet formed from a natural dried meat jerky.

* * * * *